(12) United States Patent
Li et al.

(10) Patent No.: US 11,417,885 B1
(45) Date of Patent: Aug. 16, 2022

(54) FILLED CARBON NANOTUBES AND METHODS OF SYNTHESIZING THE SAME

(71) Applicants: Wenzhi Li, Miami, FL (US); Yuba Poudel, Miami, FL (US)

(72) Inventors: Wenzhi Li, Miami, FL (US); Yuba Poudel, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/656,804

(22) Filed: Mar. 28, 2022

Related U.S. Application Data

(62) Division of application No. 17/363,395, filed on Jun. 30, 2021, now Pat. No. 11,296,319.

(51) Int. Cl.
| | | |
|---|---|---|
| *H01M 4/583* | (2010.01) | |
| *H01M 4/58* | (2010.01) | |
| *H01M 4/36* | (2006.01) | |
| *H01M 10/36* | (2010.01) | |
| *H01M 4/04* | (2006.01) | |

(52) U.S. Cl.
CPC ....... *H01M 4/5815* (2013.01); *H01M 4/0428* (2013.01); *H01M 4/366* (2013.01); *H01M 4/583* (2013.01); *H01M 10/36* (2013.01)

(58) Field of Classification Search
None
See application file for complete search history.

(56) References Cited

U.S. PATENT DOCUMENTS

| | | |
|---|---|---|
| 2013/0189565 A1 | 7/2013 | Lashmore |
| 2016/0020493 A1 | 1/2016 | Van Dijk |

OTHER PUBLICATIONS

Gaohui Du et al, Filling Carbon Nanotubes with Co9S8 Nanowires through in Situ Catalyst Transition and Extrusion, J. Phys. Chem. C 2008, 112, 1890-1895.

Qingmei Su et al., In Situ Transmission Electron Microscopy Investigation of the Electrochemical Lithiation—Delithiation of Individual Co9S8/Co-Filled Carbon Nanotubes, www.acsnano.org, vol. 7, No. 12, 2013, 11379-11387.

R. Kozhuharova et al., Synthesis and characterization of aligned Fe-filled carbon nanotubes on silicon substrates, Journal of Materials Science: Materials in Electronics 14 (2003) 789-791.

Oingmei Su et al., In Situ Synthesis of Iron/Nickel Sulfide Nanostructures-Filled Carbon Nanotubes and Their Electromagnetic and Microwave-Absorbing Properties, The Journal of Physical Chemistry, 2011, 115, 1838-1842.

(Continued)

*Primary Examiner* — Tracy M Dove
(74) *Attorney, Agent, or Firm* — Saliwanchik, Lloyd & Eisenschenk

(57) ABSTRACT

Filled carbon nanotubes (CNTs), methods of synthesizing the same, and lithium-ion batteries comprising the same are provided. In situ methods (e.g., chemical vapor deposition techniques) can be used to synthesize CNTs (e.g., multi-walled CNTs) filled with metal sulfide nanowires. The CNTs can be completely (or nearly completely) and continuously (or nearly continuously) filled with the metal sulfide fillers up to several micrometers in length. The filled CNTs can be synthesized on a carbon substrate. A lithium-ion battery can comprise a cathode, an anode comprising filled CNTs as described herein, and an electrolyte in contact with the cathode and/or the anode.

18 Claims, 8 Drawing Sheets

(56) References Cited

OTHER PUBLICATIONS

Wang-Jing Yu et al., Synthesis and Electrochemical Lithium Storage Behavior of Carbon Nanotubes Filled with Iron Sulfide Nanoparticles, Advanced Science, 2016, 3, 1600113.

Shuoyu Li et al., Self-Climbed Amorphous Carbon Nanotubes Filled with Transition Metal Oxide Nanoparticles for Large Rate and Long Lifespan Anode Materials in Lithium Ion Batteries, American Chemical Society, ACS Appl. Mater. Interfaces 2017, 9, 26818-26825.

Jinqing Hu et al., Carbon Nanotubes as Nanoreactors for Fabrication of Single-Crystalline $Mg_3N_2$ Nanowires, Nano Letters, 2006 vol. 6, No. 6, 1136-1140.

Wan-Jing Yu et al., Lithiation of Silicon Nanoparticles Confined in Carbon Nanotubes, ACS Nano, vol. 9, No. 5, 2015, 5063-5071.

M. Monthioux et al., Hybrid carbon nanotubes: Strategy, progress, and perspectives, J. Mater. Res , vol. 21, No. 11, Nov. 2006.

Yuba Raj Poudel et al., Synthesis, properties, and applications of carbon nanotubes filled with foreign materials: a review, Materials Today Physics 7 (2018) 7-34.

X. Song et al., Morphology-dependent performance of nanostructured $Ni_3S_2$/Ni anode electrodes for high performance sodium ion batteries, Nano Energy 26 (2016) 533-540.

Wan-Jing Yu et al., High Reversible Lithium Storage Capacity and Structural Changes of $Fe_2O_3$ Nanoparticles Conti ned inside Carbon Nanotubes, Advanced Energy Materials, 2016, 6, 1501755, 10 pages.

Wan-Jing Yu et al., Synthesis and Electrochemical Lithium Storage Behavior of Carbon Nanotubes Filled with Iron Sulfide Nanoparticles, Advanced Science, 2016, 1600113, 8 pages.

Lei Xu et al., Confined Synthesis of $FeS_2$ Nanoparticles Encapsulated in Carbon Nanotube Hybrids for Ultrastable Lithium-Ion Batteries, ACS Sustainable Chem. Eng. 2016, 4, 4251-4255.

Lucas Moller et al., $CoFe_2O_4$-filled carbon nanotubes as anode material for lithium-ion batteries, Journal of Alloys and Compounds 834 (2020) 155018, 6 pages.

Oingmei Su et al., In Situ Transmission Electron Microscopy Observation of Electrochemical Sodiation of Individual $Co_9S_8$-Filled Carbon Nanotubes, ACS Nano, vol. 8, N. 4, 2014, 3620-3627.

Jinliang Zhu et al., One-step synthesis of $Ni_3S_2$ nanoparticles wrapped with in situ generated nitrogen-self-doped graphene sheets with highly improvedelectrochemical properties in Li-ion batteries, J. Mater.Chem. A., The Royal Society of Chemistry 2014, 2, 3142-3147.

Xianggang Guan et al., Carbon Wrapped $Ni_3S_2$ Nanocrystals Anchored on Graphene Sheets as Anode Materials tor Lithium-Ion Battery and the Study on Their Capacity Evolution, Nanomaterials 2018, 8, 760, 14 pages.

Jia-Lin Xu et al., Ni-doped $Ni_3S_2$ nanoflake intertexture grown on graphene oxide as sheet-like anode for high-performance lithium-ion batteries, Journa of Alloys and Compounds 835 (202) 155418, 8 pages.

Ruili Zhang et al., $Ni_3S_2$@Graphene oxide nanosheet arrays grown on NF as binder-free anodes for lithium ion batteries. Journal of Alloys and Compounds 810 (2019) 151861, 7 pages.

Zhujun Yao et al., Enhanced Li-Storage of $Ni_3S_2$ Nanowire Arrays with N-Doped Carbon Coating Synthesized by One-Step CVD Process and Investigated Via Ex Situ 1 EM, Small 2019, 15, 1904433, 7 pages.

Philip G. Collins et al., Current Saturation and Electrical Breakdown in Multiwalled Carbon Nanotubes, Physical Review Letters, vol. 86, No. 14, Apr. 2, 201, 4 pages.

| $Ni_3S_2$@CNT No. | Contact Length (μm) | Diameter* (nm) | Resistance (KΩ) | Resistivity (Ωm) |
|---|---|---|---|---|
| 1 | 4.1 | 255.4 | 7.2 | $8.9 \times 10^{-5}$ |
| 2 | 4.4 | 262.7 | 7.5 | $9.2 \times 10^{-5}$ |
| 3 | 5.1 | 131.4 | 9.2 | $2.4 \times 10^{-5}$ |
| 4 | 4.7 | 225.8 | 6.5 | $5.5 \times 10^{-5}$ |
| 5 | 4.2 | 274.6 | 5.6 | $7.8 \times 10^{-5}$ |
| 6 | 4.4 | 124.3 | 10.6 | $2.9 \times 10^{-5}$ |
| 7 | 6.0 | 204.8 | 9.8 | $1.7 \times 10^{-5}$ |
| 8 | 4.1 | 170.2 | 11.1 | $6.1 \times 10^{-5}$ |
| 9 | 4.8 | 256.5 | 6.7 | $7.2 \times 10^{-5}$ |
| 10 | 4.3 | 312.4 | 6.0 | $10^{-4}$ |

*Within ±10%

Note: The resistivities were estimated assuming the $Ni_3S_2$@CNTs as three-dimensional solid cylindrical conductors.

FIG. 7

FILLED CARBON NANOTUBES AND METHODS OF SYNTHESIZING THE SAME

CROSS-REFERENCE TO RELATED APPLICATION

The present application is a divisional application of U.S. application Ser. No. 17/363,395, filed Jun. 30, 2021, the disclosure of which is hereby incorporated by reference in its entirety, including all figures, tables, and drawings.

GOVERNMENT SUPPORT

This invention was made with government support under DMR-1506640 awarded by National Science Foundation (NSF). The government has certain rights in the invention.

BACKGROUND

Since their discovery in 1991, carbon nanotubes (CNTs) have remained one of the most attractive nanomaterials. The enduring interest of researchers and scientists towards CNTs over the past three decades relies on numerous findings that have proven the unique and superior physical properties of CNTs. For example, multi-walled CNTs possess an exceptionally high Young's modulus in the terapascal (TPa) range and a thermal conductivity of more than 3000 Watts per Kelvin per meter ($WK^{-1}$ $m^{-1}$) at room temperature. Similarly, they exhibit metallic or semiconducting properties depending upon their diameter and helicity and can pass a high current density up to 109 Amps per square centimeter ($Acm^{-2}$) without any structural failure. Besides the intrinsic properties owned by CNTs, many strategies have been put forward to further enhance them with an aim to broaden their real-life applications. Among many, the filling of the CNT interior remains an attractive method to synergize the qualities of both the CNT and that of the filling material to bring about a novel nanohybrid, known as a filled CNT. This is possible due to the unique tubular structure of CNT that offers the possibility of filling its hollow core with a variety of inorganic and organic materials.

Related art methods for filling CNTs are ex situ (post-synthesis filling) methods. In addition, when it comes to real applications of metal-filled CNTs, it is important to separate metallic CNTs and semiconducting CNTs. Related art methods to attempt to do this include dielectrophoresis, gel-based adsorption, chemical treatment, and microwave irradiation.

BRIEF SUMMARY

Embodiments of the subject invention provide novel and advantageous filled carbon nanotubes (CNTs) and methods of synthesizing the same. In situ methods (e.g., chemical vapor deposition techniques) can be used to synthesize CNTs (e.g., multi-walled CNTs) filled with metal sulfide (e.g., nickel sulfide, iron sulfide, cobalt sulfide) nanowires. The CNTs can be completely (or nearly completely) and continuously (or nearly continuously) filled with the metal sulfide fillers (e.g., metal sulfide nanowires, such as single crystalline nanowires) up to several micrometers in length. The filled CNTs can be synthesized on a carbon substrate (e.g., a carbon cloth). The filled CNTs grown on the carbon substrate (e.g., carbon cloth) have excellent electrical conductivity, as well as high lithium storage and excellent cyclability when used as anode materials for lithium-ion batteries (LIBs). In addition, the filled CNTs grown on the carbon substrate (e.g., carbon cloth) can also be used as an anode materials for sodium-ion batteries (SIBs) and have great potential to develop high-performance SIBs. The allowed maximum electrical current in the filled CNTs is size-dependent so the filled CNTs can advantageously be used as nano breakers for electronic devices.

In an embodiment, a method of synthesizing filled CNTs can comprise: providing a carbon-based substrate in a reaction chamber; disposing a catalyst comprising a metal on the substrate; providing a sulfur-containing organic compound to the reaction chamber; and performing a chemical vapor deposition technique to simultaneously grow CNTs and fill the CNTs with a metal sulfide comprising the metal, thereby synthesizing the filled CNTs filled with the metal sulfide. The carbon-based substrate can be carbon cloth, graphene, graphite, graphene oxide, carbon block, carbon fiber threads, carbon nanotube films, a carbon-coated substrate, a graphite-coated substrate, or a carbon nanotube film-coated substrate. The metal can be, for example, nickel, cobalt, or iron. For example, the metal can be nickel and the metal sulfide can be $Ni_3S_2$. The sulfur-containing organic compound can be, for example, thiophene, dimethyl sulfide, or thiourea. The providing of the sulfur-containing organic compound to the reaction chamber can comprise: providing a supply of the sulfur-containing organic compound outside the reaction chamber; and sending a gas through the supply of the sulfur-containing organic compound and into the reaction chamber such that the sulfur-containing organic compound is bubbled into the reaction chamber with the gas. The method can further comprise: before providing the sulfur-containing organic compound to the reaction chamber, heating the reaction chamber having the catalyst disposed on the carbon-based substrate to a first predetermined temperature for a first predetermined amount of time while flowing an inert gas through the reaction chamber; passing hydrogen gas through the reaction chamber to reduce the catalyst; and after reducing the catalyst, stopping the flowing of the hydrogen gas through the reaction chamber while continuing to flow the inert gas through the reaction chamber while heating the reaction chamber to a second predetermined temperature. The method can further comprise: at the second predetermined temperature, flowing the inert gas at a first predetermined flow rate while flowing the hydrogen gas through a bubbler containing the sulfur-containing organic compound, for a second predetermined amount of time; and stopping the hydrogen gas, reducing the inert gas to a second predetermined flow rate lower than the first predetermined flow rate, and cooling down the reaction chamber naturally to room temperature to complete the synthesis of the filled CNTs. The method can further comprise collecting the filled CNTs via ultrasonication. The carbon-based substrate can be in pristine form immediately prior to the catalyst being disposed thereon, such that no pre-treatment process (e.g., heat pre-treatment process, chemical activation pre-treatment process, or plasma pre-treatment process) is performed on the carbon-based substrate prior to the catalyst being disposed thereon. The CNTs can have an average filling ratio (the (average) proportion of an individual CNT that is filled as a fraction of the total CNT) of the metal sulfide of, for example, at least 0.90. The CNTs can have an average filling rate (the proportion of CNTs that are filled as a fraction of all CNTs) of the metal sulfide of, for example, at least 0.90. The catalyst can be nanoparticles (NP) of the metal, and the method can further comprise: before disposing the catalyst on the substrate, dispersing the NPs in a solvent and putting the solvent in an ultrasonication bath to achieve a uniform suspension of the NPs in the solvent; immersing at least a portion of the carbon-based substrate in a container having the suspension of the NPs in the solvent and leaving the at least a portion of the carbon-based substrate dip coating in the container while stirring the container using a magnetic stirrer to achieve a uniform coating of the catalyst on the at least a portion of the carbon-based substrate; and transferring the at least a portion of the carbon-based substrate to a heating apparatus and heating the at least a portion of the carbon-based substrate to evaporate the solvent. The catalyst can be a salt of the metal, and the method further can further comprise: before providing the sulfur-containing organic compound to the reaction chamber, heating the reaction chamber to a first predetermined temperature for a first predetermined amount of time to oxidize the catalyst; after oxidizing the catalyst, flowing an inert gas through the reaction chamber and passing hydrogen gas through the reaction chamber to reduce the catalyst; and after reducing the catalyst, stopping the flowing of the hydrogen gas through the reaction chamber while continuing to flow the inert gas through the reaction chamber while heating the reaction chamber to a second predetermined temperature. The disposing of the catalyst on the carbon-based substrate can comprise: preparing a catalyst solution by mixing a powder of the salt of the metal in a solvent; providing the catalyst solution to the carbon-based substrate; and performing a two-stage spin coating to form a uniform coating of the catalyst on a surface of the carbon-based substrate.

In another embodiment, a compound can comprise: a carbon-based substrate; a CNT disposed on the carbon-based substrate; and a nanowire of a metal sulfide filled in the CNT. The carbon-based substrate can be carbon cloth, graphene, graphite, graphene oxide, carbon block, carbon fiber threads, carbon nanotube films, a carbon-coated substrate, a graphite-coated substrate, or a carbon nanotube film-coated substrate; the CNT filled with the nanowire can be straight from a first end thereof to a second end thereof; and/or each of the first end and the second end of the CNT filled with the nanowire can be closed with respective carbon shells. The metal sulfide can be, for example, nickel sulfide, cobalt sulfide, or iron sulfide. For example, the metal sulfide can be Ni3S2.

In another embodiment, a battery can comprise: a cathode (e.g., a cathode comprising lithium and/or sodium); an anode comprising a compound as described herein (e.g., a carbon-based substrate with at least one metal sulfide-filled CNT (e.g., Ni3S2-filled CNT(s)) disposed thereon, or an anode comprising a current collector comprising at least one metal sulfide filled CNT (e.g., Ni3S2-filled CNT(s))); and an electrolyte in contact (e.g., in direct physical contact) with the cathode and/or the anode (e.g., disposed between the anode and the cathode). The carbon-based substrate can be, for example, carbon cloth. The battery can be a lithium-ion battery or a sodium-ion battery.

BRIEF DESCRIPTION OF DRAWINGS

FIG. 6a is at time=0 seconds; FIG. 6b is at time=20 seconds; FIG. 6c is at time=30 seconds; FIG. 6d is at time=40 seconds; FIG. 6e is at time=50 seconds; and FIG. 6f is at time=60 seconds. The scale bar for each is 200 nm.

FIG. 7 is a table of estimations of the resistivity of individual $Ni_3S_2$-filled CNTs.

DETAILED DESCRIPTION

Figures 1A, 1B, 1C, 1D, 1E, 1F:
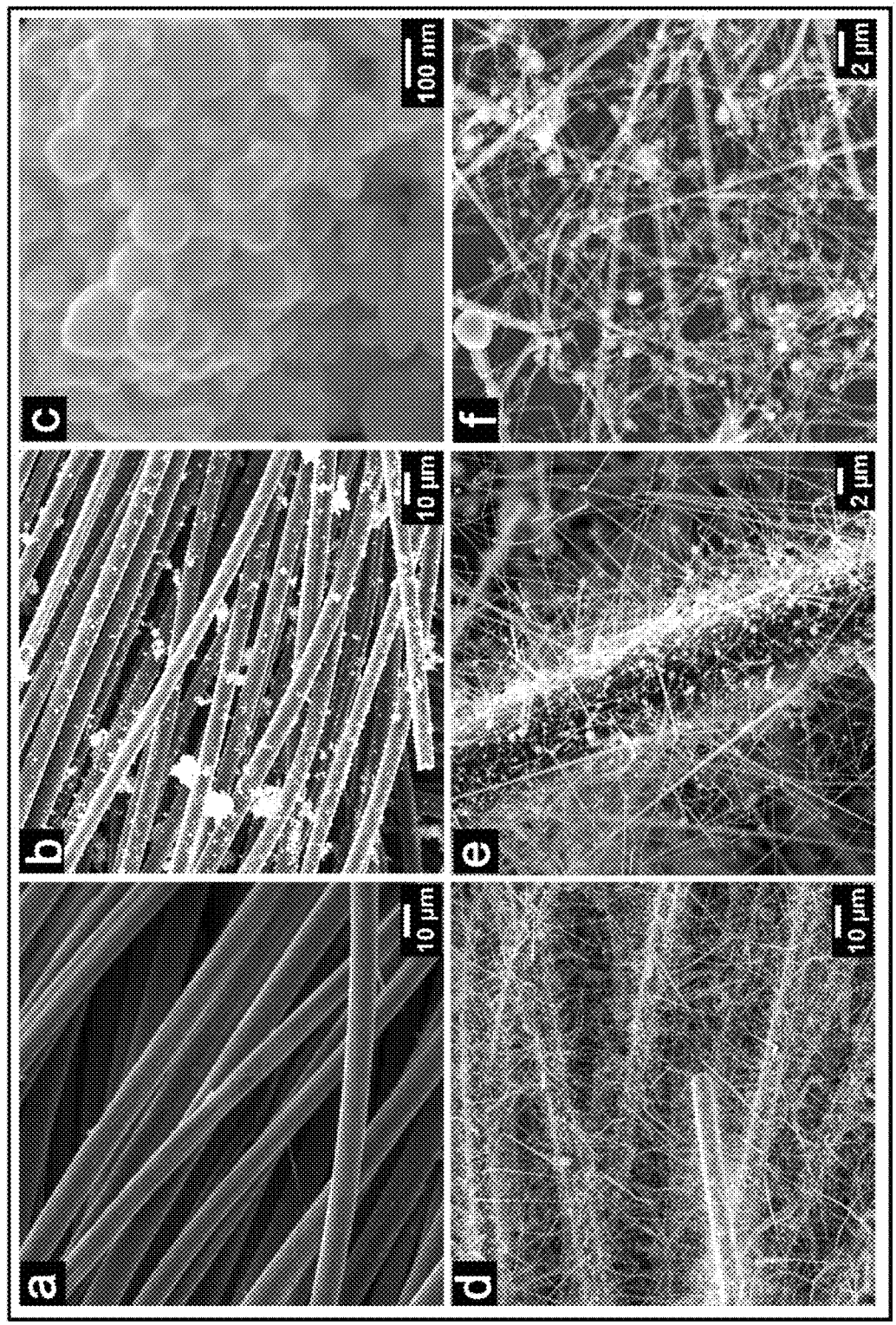
FIG. 1a is a scanning electron microscope (SEM) image of pristine carbon cloth (CC). The scale bar is 10 micrometers (μm).
FIG. 1b is an SEM image of CC after loading nickel (Ni) nanoparticle (NP) catalysts. The scale bar is 10 μm.
FIG. 1c is a high magnification SEM image of as-dispersed Ni NPs. The scale bar is 100 nanometers (nm).
FIG. 1d is an SEM image of nickel sulfide ($Ni_3S_2$)-filled carbon nanotubes (CNTs) on CC. The scale bar is 10 μm.
FIG. 1e is a lower magnification SEM image of $Ni_3S_2$-filled CNTs on CC. The scale bar is 2 μm.
FIG. 1f is an SEM image of $Ni_3S_2$-filled carbon nanotubes (CNTs) collected via ultrasonication and deposited on a silicon wafer by spin-coating. The scale bar is 2 μm.

Embodiments of the subject invention provide novel and advantageous filled carbon nanotubes (CNTs) and methods of synthesizing the same. In situ methods (e.g., chemical vapor deposition techniques) can be used to synthesize CNTs (e.g., multi-walled CNTs) filled with metal sulfide (e.g., nickel sulfide, iron sulfide, cobalt sulfide) nanowires. The CNTs can be completely (or nearly completely) and continuously (or nearly continuously) filled with the metal sulfide fillers (e.g., metal sulfide nanowires, such as single crystalline nanowires) up to several micrometers (μm) in length. The filled CNTs can be synthesized on a carbon substrate (e.g., graphene, graphite, graphene oxide, carbon block, carbon fiber threads, carbon nanotube films, (flexible) carbon cloth, or carbon/graphite coated substrates (for example, carbon-coated stainless steel, carbon-coated copper, etc.))). The carbon substrate does not require any pre-treatment process (e.g., heat treatment, chemical activation, plasma treatment, etc.) and can be used in pristine form to load catalyst particles and subsequently synthesize filled CNTs in one step.

The filled CNTs grown on the carbon substrate (e.g., graphene, graphite, graphene oxide, carbon block, carbon fiber threads, carbon cloth, carbon nanotube films, or carbon/graphite coated substrates (for example, carbon-coated stainless steel, carbon-coated copper, etc.)) have excellent electrical conductivity, as well as high lithium storage and excellent cyclability when used as anode materials for lithium-ion batteries (LIBs). In addition, the filled CNTs grown on the carbon substrate (e.g., carbon cloth) can also be used as an anode materials for sodium-ion batteries (SIBs) and have great potential to develop high-performance SIBs. The allowed maximum electrical current in the filled CNTs is size-dependent so the filled CNTs can advantageously be used as nano breakers for electronic devices.

In many embodiments, in situ chemical vapor deposition (CVD) can be used to synthesize CNTs (e.g., multi-walled CNTs or single-walled CNTs) with metal sulfide (e.g., nickel sulfide ($Ni_3S_2$), iron sulfide ($Fe_xS_y$), cobalt sulfide ($Co_9S_8$)) nanowires. Pure metal (e.g., nickel, iron, cobalt, etc.) nanoparticles or their salts can be used as a catalyst and filling precursor of the CNTs. Examples of salts that can be used as a catalyst and filling precursor include but are not limited to metal nitrates (e.g., nickel nitrate, iron nitrate, cobalt nitrate, etc.), metal chlorides (nickel chloride, iron chloride, cobalt chloride, etc.), and metal sulfates (e.g., nickel sulfate, iron sulfate, cobalt sulfate, etc.). An organosulfur (can also be spelled as organosulphur) compound (also called organic sulfur compound) (e.g., thiophene, dimethyl sulfide, thiourea, etc.) can be used as both a carbon precursor and sulfur precursor for the synthesis of metal sulfide-filled CNTs. The CNT growth and filling of its core with metal sulfide can occur simultaneously, which can be referred to as an in situ filling process. The metal sulfide-filled CNTs can be synthesized on a carbon substrate (e.g., graphene, graphite, graphene oxide, carbon block, carbon fiber threads, carbon cloth, carbon nanotube films, or carbon/graphite coated substrates (for example, carbon-coated stainless steel, carbon-coated copper, etc.)). In some embodiments, ultrasonication can be used to collect the filled CNTs after synthesis (a magnet may optionally be used to purify the filled CNTs during/after collection; and/or the collected filled CNTs may optionally be deposited on a substrate (e.g., a wafer such as a silicon wafer), for example by spin-coating). The substrate can be flexible (i.e., not rigid), such as flexible carbon cloth.

The synthesis of the filled CNTs is in situ in synthesis methods of embodiments of the subject invention, unlike related art ex situ filling methods, which are post-synthesis techniques that involve three steps (CNT synthesis, CNT opening, and CNT filling). The filled CNTs of embodiments of the subject invention are closed at both of their ends while the filled CNTs in related art ex situ methods are open at one or both of their ends. Synthesis methods for filling CNTs according to embodiments of the subject invention are reliable and efficient at producing metal sulfide-filled CNTs with closed ends, and the in situ methods can encapsulate very long metal-sulfide nanowires (e.g., up to 30 m or more in length) inside carbon nanotubes, which cannot be reliably achieved using state-of-the-art related art synthesis methods.

Embodiments of the subject invention provide the first methods of synthesizing metal sulfide-filled CNTs on carbon-based materials (e.g., graphene, graphite, graphene oxide, carbon block, carbon fiber threads, carbon cloth, carbon nanotube films, or carbon/graphite coated substrates). The size-dependent maximum current flow through the metal sulfide-filled CNTs is also novel, as is the excellent lithium storage capability of the metal sulfide-filled CNTs grown on a carbon substrate (carbon cloth in particular).

The metal sulfide-filled CNTs can be directly grown on the carbon-based substrate, which avoids the process of binding filled CNTs on the substrate using glue or any other adhesive or binder. The amount of metal sulfide-filled CNTs on carbon-based substrates can be controlled by tuning the growth parameters, which is not possible in state-of-the-art related art synthesis methods. By controlling the synthesis conditions, the filling rate (the proportion of CNTs that are filled as a fraction of all CNTs) and the filling ratio (the (average) proportion of an individual CNT that is filled as a fraction of the total CNT) of the CNTs by the metal sulfides can be controlled. The metal sulfide filling leads to the high crystallization of the carbon nanotubes. Embodiments of the subject invention enable large-scale production of metal sulfide-filled CNTs on carbon-based substrates, as well as easy synthesis of large-scale, high-quality, and high purity metal sulfide-filled CNTs on carbon-based materials to meet various application requirements.

Embodiments of the subject invention provide methods to synthesize metal sulfide (e.g., $Ni_3S_2$) nanowire-filled CNTs on a carbon substrate (e.g., carbon cloth). A metal sulfide-filled CNT can be denoted using a shorthand notation as $Ni_3S_2$@CNTs (meaning $Ni_3S_2$-filled CNTs). Also, $Ni_3S_2$@CNTs/CC is a shorthand notation for $Ni_3S_2$-filled CNTs on carbon cloth (CC). The filling rate can be determined by the synthesis conditions and can be anywhere from 0 (i.e., 0%) to 1.0 (i.e., 100%), depending on the desired application. For example, the filling rate can be at least 0.80 (i.e., 80%), at least 0.85 (i.e., 85%), at least 0.90 (i.e., 90%), at least 0.95 (i.e., 95%), at least 0.99 (i.e., 99%), or at least 0.999 (i.e., 99.9%). The filling ratio can be determined by the synthesis conditions and can be anywhere from 0 (i.e., 0%) to 1.0 (i.e., 100%), depending on the desired application. For example, the filling ratio can be at least 0.80 (i.e., 80%), at least 0.85 (i.e., 85%), at least 0.90 (i.e., 90%), at least 0.95 (i.e., 95%), at least 0.99 (i.e., 99%), or at least 0.999 (i.e., 99.9%). The dimensions (length and average diameters) of the filled-CNTs can be controlled by changing the synthesis conditions. Any carbon-based material (substrate) of any size and shape (e.g., circular, square, rectangular, etc.) can be used, as long as it fits in the synthesis chamber. An organosulfur compound (e.g., thiophene ($C_4H_4S$), dimethyl sulfide, thiourea, etc.) can be used as both a carbon source and a sulfur source. Metal nanoparticles (e.g., nickel nanoparticles, iron nanoparticles, cobalt nanoparticles, etc.) can be used as catalysts to synthesize the metal sulfide nanowire-filled CNTs on carbon-based substrates. The size and loading amount of the metal nanoparticles can affect the filling rate and the filling ratio, as well as the yield of the metal sulfide nanowire-filled CNTs. Metal salts (e.g., metal nitrates, metal sulfates, or metal chlorides) can be used as the catalyst material to synthesize the metal sulfide nanowire-filled CNTs on carbon-based substrates. The concentration and the loading amount of the metal salt solution can affect the filling rate and the filling ratio, as well as the yield of the metal sulfide nanowire-filled CNTs. The filled CNTs have metallic properties (e.g., $Ni_3S_2$@CNTs have shown metallic properties with an average resistivity of $6.1 \times 10^{-5}$ Ohm-meters ($\Omega$m). The electrical breakdown of the filled CNTs is size-dependent, which makes them good candidates as nano circuit breakers. The filled CNTs (e.g., $Ni_3S_2$@CNTs/CC) can be used as an anode for an LIB or an SIB. For example, as an LIB anode, $Ni_3S_2$@CNTs/CC have been shown to have a lithium-ion storage capacity of about 3420 milliamp-hours per gram ($mAhg^{-1}$) even after 20 cycles at a current density of 100 milliamps per gram ($mAg^{-1}$), and they have also been shown to have high stability with a Coulombic efficiency of around 100% within 20 charge-discharge cycles. Thus, the filled CNTs of embodiments of the subject invention (e.g., $Ni_3S_2$@CNTs/CC) can help develop high-performance LIBs.

Related art CNT synthesis methods can only generate a mixture of metallic and semiconducting CNTs, but when it comes to real applications, it is extremely important to separate the metallic CNTs and semiconducting CNTs. In view of the problems in the related art, there exists a need in the art for a reliable synthesis method that can yield 100% metallic or 100% semiconducting filled carbon nanotubes (CNTs) for different applications. The in situ fillings of CNT cores with metal sulfide (e.g., $Ni_3S_2$) nanowires, according to embodiments of the subject invention, can yield all metallic CNTs (100%) and solve the problem of separating metallic CNTs for any desired application. There are two major advantages of filling metal sulfide (e.g., $Ni_3S_2$) nanowires inside CNTs. First, metal sulfides possess intrinsic metallic behavior (e.g., $Ni_3S_2$ itself possesses a measured resistivity of $1.2 \times 10^{-6}$ $\Omega$m), which can dramatically change the electrical properties of CNTs facilitating the charge transportation along the filled CNTs, The other benefit of encapsulating metal sulfide (e.g., $Ni_3S_2$) nanowires inside the CNTs is that the robust walls of the CNTs can inhibit or prevent the metal sulfide filler from any damage or degradation during several applications, such as the application in lithium-ion batteries (LIBs) as an anode material.

In situ (simultaneous synthesis and filling) synthesis methods of embodiments of the subject invention serve as reliable methods to fill CNT cores with long and continuous nanowires extending from the roots to the tip of the CNT. Also, being a one-step filling technique, the in situ filling allows easy control over the growth and filling parameters making the process efficient, quick, and economic. CNTs have been filled with a wide variety of materials using ex situ related art methods, but the in situ filling of embodiments of the subject invention is more challenging as it requires the presence of both the metal catalyst and the precursor of the filling material at the CNT growth sites causing a simultaneous graphitization of CNT walls and filling of its interior. Transition metal sulfide (e.g., $Ni_3S_2$) can be filled inside the CNTs using metal as the catalyst for CNT growth and the precursor for the filling material. When a proper amount of sulfur is released into the reaction chamber, both phenomena—the graphitization of CNT walls and formation of the metal sulfide (e.g., $Ni_3S_2$), can occur simultaneously at the active sites causing the in situ fillings of CNTs with long and continuous, single-crystalline metal sulfide (e.g., $Ni_3S_2$) nanowires.

Metal sulfide-filled CNTs (on carbon substrates) of embodiments of the subject invention can be used as an anode material in an LIB (or SIB). With the rapidly growing use of battery powered electronic devices and electric vehicles, there exists a dire need for high-capacity LIBs to solve the global problem pertaining to the escalating crisis in renewable energy. Related art LIBs implement graphite as an anode material that has high stability but a very low lithium-ion storage capacity (about 372 $mAhg^{-1}$). While attempts have been made in the related art to develop novel high-capacity nanomaterials and nanocomposites to use as LIB anodes, they have encountered several challenges such as the structural failure of the active material after several cycles of lithiation and de-lithiation, oxidation and corrosion of the metallic electrode (substrate), and poor binding between the active material and the electrode (substrate) surface due to the presence of a buffer layer or an extraneous binding agent. A major reason for the failure of such materials can be the low filling ratio obtained from the ex situ filling techniques. Also, semiconducting nanoparticles that are sometimes used in related art materials may not offer a quick transport of electrons and ions during the charge-discharge cycles. In addition, the extrusion of the lithiated filler, as the CNTs synthesized on anodic aluminum oxide (AAO) templates are open at both ends, can cause problems. Moreover, such related art devices suffer from instability and small diameter-CNTs (e.g., about 50 nm) along with a relatively low graphitization that can eventually breakdown over several cycles of expansion and contraction. All these problems can be solved by embodiments of the subject invention, by synthesizing a high-capacity material directly on a stable and conductive substrate such as carbon cloth (CC) encapsulating the active material inside a highly graphitized multi-walled CNT system closed at both ends. A CNT with closed ends can undergo a high radial expansion and contraction without falling apart during lithiation and de-lithiation of the filler and can inhibit (or prevent) extrusion of the active filler. Metal sulfide-filled CNTs on CC can address all these challenges and serve as an anode in improved LIBs. CC as a substrate has high tensile strength, high stiffness, thermal stability, low weight, and high chemical resistance against oxidation and corrosion. On the other hand, bulk $Ni_3S_2$ possesses a theoretical capacity of 445 $mAhg^{-1}$, which is relatively high compared to that of graphite. The synergistic effects arising from the CNTs, the metal sulfide (e.g., $Ni_3S_2$) nanowire filler, the physiochemical stability of the CC, the absence of any buffer or binder between the filled CNTs and the CC surface, and the closed tip structure of the filled CNTs can produce excellent results and improved the capacity of LIBs. Meanwhile, the high metallicity of the individual filled CNTs can also support the ultra-fast charging of the LIBs.

The metal sulfide-filled CNTs on carbon substrates (e.g., carbon cloth) of embodiments of the subject invention provide researchers with the opportunity to investigate the physical and chemical properties of this type of material. The filled CNTs can be used in electronic devices (e.g., microwave absorbers, sensing probes for magnetic force microscopy, magnetic recording, and data storage devices, nanothermometers, nano circuits, nano circuit breakers, etc.), biological or biomedical applications, (e.g., bio/chemical sensors, drug delivery/carrier systems, biomarkers, bio-imaging, etc.), environmental protection (e.g., removing heavy metal ions and contaminants from water and/or purifying the air), energy storage (e.g., LIBs, SIBs, supercapacitors, solar cells, etc.), energy production (e.g., water splitting to generate oxygen and hydrogen, clean energy sources), and/or field emission devices (e.g., field emission electron microscopes, field emission spectrometers, etc.).

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Materials and Methods

Nickel (Ni) nanoparticles (NPs) (99.9%, 40 nm, metal basis) were purchased from US Research Nanomaterials, Inc., and carbon cloth (CeTech carbon cloth without microporous layer) having a thickness of 330 μm was purchased from the Fuel Cell Store. Isopropyl alcohol (IPA) was purchased from Fisher Scientific and was used as received. Thiophene ($C_4H_4S$) of extra pure grade (99+%) was purchased from Acros Organics and was used as the precursor for both the carbon and sulfur. Gold (Au) electrodes (both two and four probes) were pre-patterned on a silicon oxide/silicon ($SiO_2$/Si) wafer using photolithography to conduct the electrical measurements. For the electrochemical characterization, a coin cell was assembled in an argon-filled glovebox and used for half-cell test, which included $Ni_3S_2$@CNTs/CC as a working electrode, and lithium metal as both counter and reference electrodes. A 100 microliter (μl) volume of 1 molar (M) $LiPF_6$ in ethylene carbonate-diethyl carbonate (1:1, volume ratio) was used as an electrolyte whereas Celgard 2400 polypropylene was used as a separator. In order to construct a nanobattery for in situ lithiation, $Ni_3S_2$@CNTs were scraped from the substrate using a razor blade and affixed to an aluminum (Al) wire using conductive epoxy. The sample was then loaded in a nanofactory STM-TEM vs. Li metal on a tungsten probe.

The scanning electron microscope (SEM) images were obtained using JSM-F100 Schottky Field Emission Scanning Electron Microscope at an accelerating voltage of 15 kilovolts (kV). X-ray spectroscopy was performed on powder samples using Siemens Diffraktometer D5000 with Cu Kα radiation (λ=1.54 Å). The electrical characterizations were performed using Keithley 2400 Source meter, and the Galvanostatic charge/discharge (GCD) tests were conducted using a NEWARE BTS-610 battery tester. The dynamic in situ lithiation test was performed inside a Thermo Fisher Scientific Titan G2 ETEM with a Gatan K3-IS camera.

Example 1—Synthesis of $Ni_3S_2$@CNTs/CC

Figure 8:
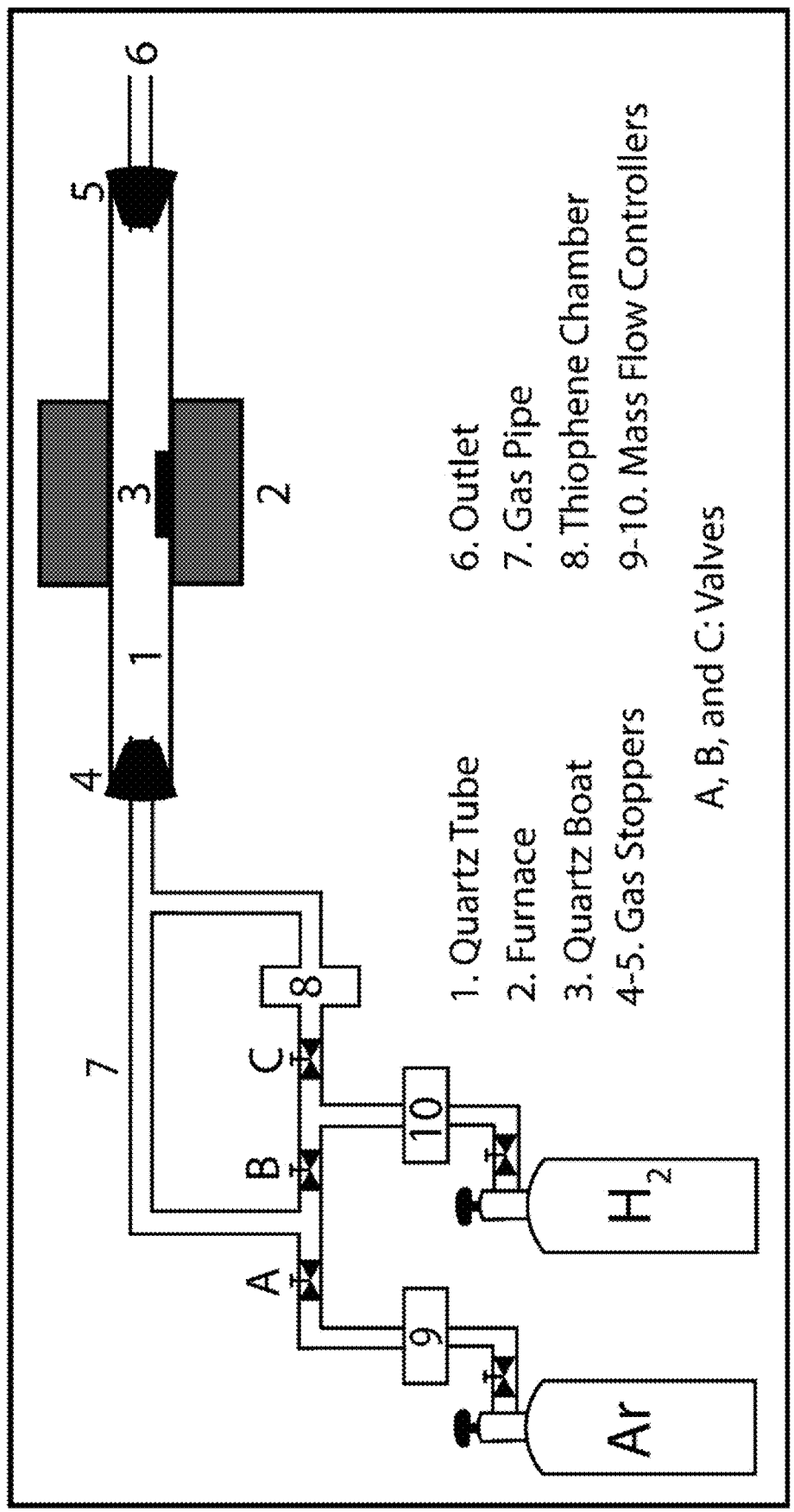
FIG. 8 is a schematic view of a setup for in situ synthesis of filled CNTs using a chemical vapor deposition technique, according to an embodiment of the subject invention.

Ni nanoparticles (NPs) were dispersed in IPA (5-100 grams per liter (g/l)) and kept in an ultrasonication bath for 5 minutes to achieve a uniform suspension of NPs, and then the suspension was transferred in a clean beaker ready for use. CC was cut into small pieces in desired shapes (square, rectangular, or circular) and cleaned by deionized (DI) water and IPA successively by a rinsing and drying method. The CC substrates were individually immersed in the beaker containing the IPA-Ni NPs suspension and left for dip coating for 5 minutes. During that time, the contents of the beaker were continuously stirred using a magnetic stirrer at 500-1000 revolutions per minute (rpm) to inhibit or prevent the agglomeration of Ni NPs at the bottom of the beaker as well as to achieve a uniform coating of Ni NPs on the threads of CC. Immediately after dip-coating, the CC was transferred to a hot plate maintained at 150° C. and heated for 5 minutes to evaporate the IPA from its surface. Afterwards, three to four CC substrates loaded with Ni catalyst NPs were placed in a quartz boat and aligned to the center of a quartz tube which was then heated in a furnace at 600° C. for 10 minutes (mins) in the presence of argon (Ar) flowing at a rate of 100-200 standard cubic centimeters per minute (sccm) to stabilize an inert environment. Afterwards, hydrogen gas ($H_2$) was passed into the reaction chamber at a flow rate of 100-200 sccm for 15 mins to reduce the catalyst Ni NPs in pure metallic form. After reduction, the flow of $H_2$ was stopped while Ar continued to flow until the temperature of the furnace reached to 1000° C. -1200° C. The flow rate of Ar was then increased to 1650-1850 sccm and $H_2$ was resumed to flow at 100-200 sccm along a new path bubbling through thiophene ($C_4H_4S$), which was used as a precursor for both carbon and sulfur. In a synthesis duration of 5-30 mins, the in situ growth of $Ni_3S_2$@CNTs could be achieved. When the synthesis was complete, the flow of $H_2$ was stopped and the reaction chamber was cooled down gradually under an inert atmosphere maintaining the Ar flow at 100-200 sccm. It is very important to note that CC substrates do not require any pre-treatment process such as heat treatment, chemical activation, plasma treatment, etc., and can be used in pristine form to load the catalyst particles and subsequently synthesize $Ni_3S_2$@CNTs in one step. This method also applies to other types of carbon-based substrates such as graphene, graphite, graphene oxide, carbon block, and carbon fiber threads. The setup shown in FIG. 8 was used for the synthesis of $Ni_3S_2$@CNTs/CC.

FIG. 1a shows a section of a pristine CC substrate containing a stack of several carbon threads, which can be loaded with Ni NPs catalysts by a dip-coating method. Such loading of catalyst particles can be clearly seen in FIG. 1b, where Ni NPs appear to attach to each individual carbon thread. This loading density, however, can be controlled by changing the concentration of Ni NPs-IPA suspension. For example, one shown in FIG. 1b was achieved using a 20 g/l concentration of the catalyst particles; however, successful growth was observed using any catalyst concentration in the range of 5-100 g/l. It was found that the catalyst concentration is directly related to the quantification of $Ni_3S_2$@CNTs meaning that the mass and growth density of $Ni_3S_2$@CNTs on the CC substrate can be controlled by changing the concentration of Ni NPs suspension. FIG. 1c shows a high magnification SEM image of a cluster of Ni NPs with an average diameter of 40 nm dispersed in the CC substrate. It is important to understand that these smaller catalyst particles can melt and fuse together at higher temperature to form bigger Ni NPs (200 nm-1 µm), which are the actual catalysts for the nucleation and growth of $Ni_3S_2$@CNTs. FIGS. 1d and 1e show the uniform growth of $Ni_3S_2$@CNTs on the CC substrate. It was observed that $Ni_3S_2$@CNTs possess a unique morphology characterized by their spherical roots and a tapering structure from the root towards the tip along with a high degree of linearity. $Ni_3S_2$@CNTs/CC can easily be collected in powder/cluster form through the ultrasonication of the substrate for 5-10 minutes and can be used to deposit as a thin film on another substrate as shown in Figure if.

Figure 2:
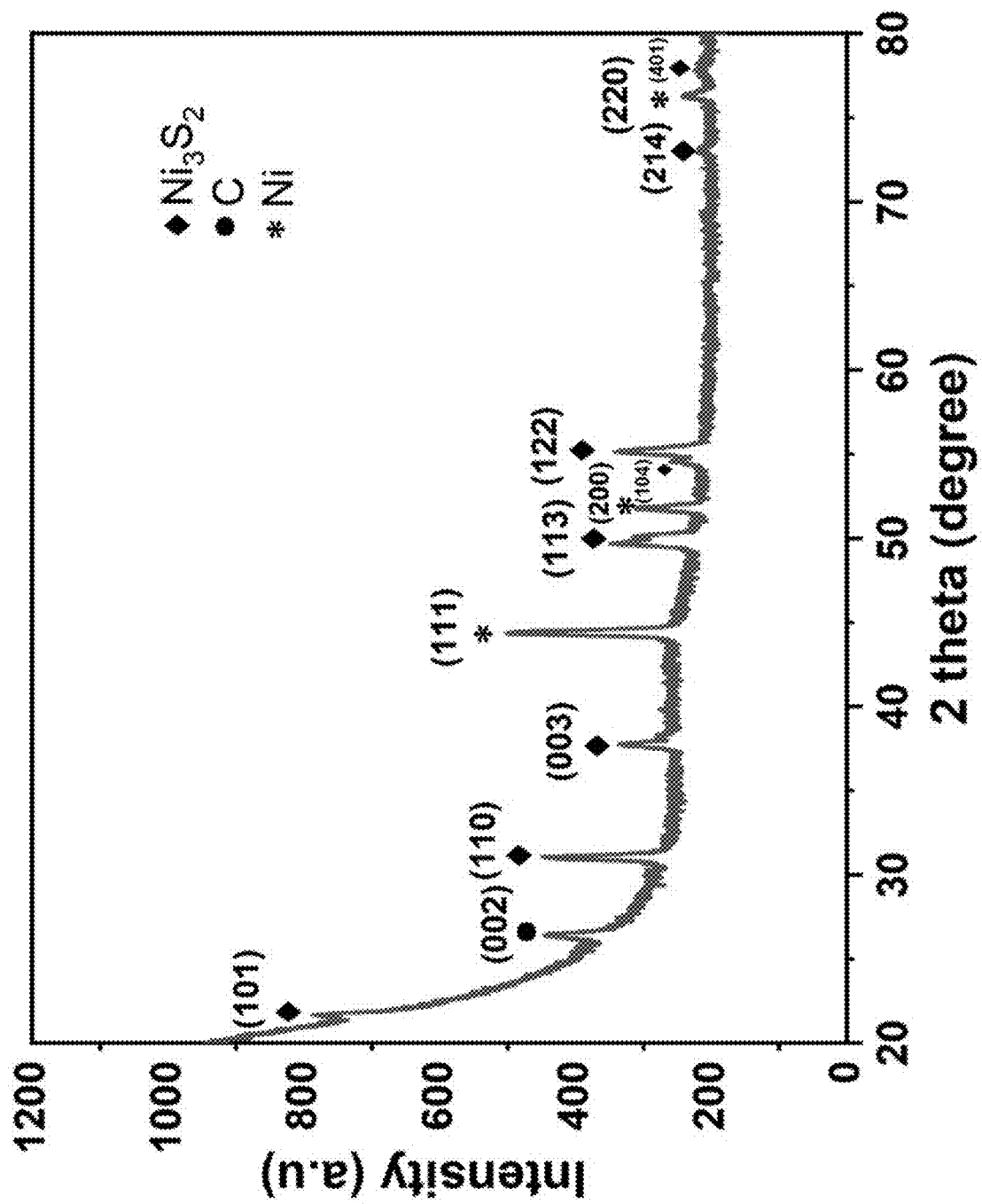
FIG. 2 is an X-ray diffraction (XRD) spectrum of $Ni_3S_2$-filled CNTs

XRD measurement was employed to confirm the crystal structure and phase composition of the $Ni_3S_2$. The diffraction patterns marked with diamond symbols in FIG. 2 can be indexed as (101), (110), (003), (113), (104), (122), (214), and (401) planes of rhombohedral $Ni_3S_2$ (ICDD reference card No: 00-044-1418) which correspond to the 2θ values of 21.75°, 31.10°, 37.77°, 49.73°, 54.61°, 55.16°, 73.04°, and 77.89°, respectively. The (002) peak for the carbon nanotube can be clearly observed at 26.36°, whereas the three peaks (111), (200), and (220) designated with star symbols represent the diffraction patterns of Ni corresponding to the 2θ values of 44.50°, 51.84°, and 76.36° respectively. The presence of Ni in the XRD profile of $Ni_3S_2$@CNTs is due to unreacted Ni catalyst spheres present at the root of each $Ni_3S_2$@CNT.

Figures 3A, 3B, 3C, 3D:
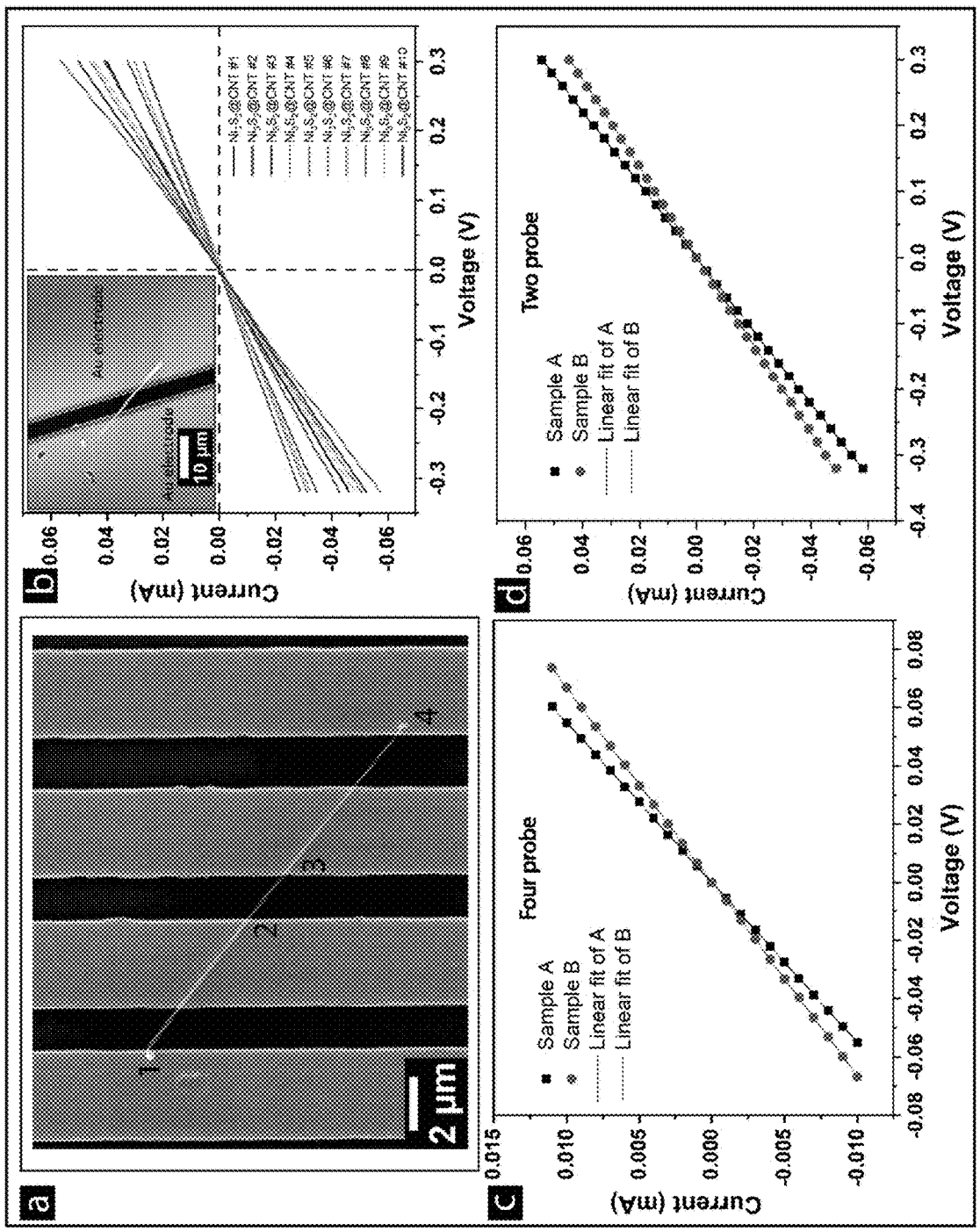
FIG. 3a is an SEM image of $Ni_3S_2$-filled CNTs in contact with four gold (Au) electrodes. The scale bar is 2 μm.
FIG. 3b is a plot of current (in milliamps (mA)) versus voltage (in Volts (V)), showing the current-voltage (I-V) characteristics of ten different $Ni_3S_2$-filled CNTs measured using a two-probe method. The inset shows an atomic force microscope (AFM) image of an individual $Ni_3S_2$-filled CNT in contact with two Au electrodes; the scale bar for the inset is 10 μm. The legend for the lines on the plot list "$Ni_3S_2$@CNT #1", "$Ni_3S_2$@CNT #2", and so on through "$Ni_3S_2$@CNT #10" (where "$Ni_3S_2$@CNT is a shorthand notation for $Ni_3S_2$-filled CNT).
FIG. 3c is a plot of current (in mA) versus voltage (in V), showing the I-V characteristics of segment 2-3 (as labeled in FIG. 3a) of two samples (labeled A and B) using a four-point probe method.
FIG. 3d is a plot of current (in mA) versus voltage (in V), showing the I-V characteristics of segment 2-3 (as labeled in FIG. 3a) of two samples (labeled A and B) using a two-point probe method.

The electrical properties of individual $Ni_3S_2$@CNTs were measured using both four-point probe and two probe methods. First, Au electrodes (both four and two electrodes) were deposited on a $SiO_2$/Si wafer using photolithography as shown in FIGS. 3a and 3b (AFM image in the inset of FIG. 3b). A very dilute suspension of $Ni_3S_2$@CNT-IPA was then made and a 5 µl volume of it was dropped and spin-coated on the pre-patterned wafer containing the electrodes. The electrode system was immediately investigated in an optical microscope at an operating magnification of 100× to confirm if any single $Ni_3S_2$@CNT has passed across the electrodes. The process was repeated several times until a single $Ni_3S_2$@CNT was observed to pass through the Au electrodes. The wafer containing Au electrodes was cleaned in an ultrasonication bath after each trial to remove any cluster of $Ni_3S_2$@CNTs in the intermediate steps. Once a nanotube was found to make contact with the electrodes, it was focused under a scanning electron microscope at higher magnifications (X5000 and above) and continuously welded using an SEM electron beam by scanning the nanotube-electrode contact regions 5-10 times. This process can make a better contact between the $Ni_3S_2$@CNT and the Au electrodes prior to their I-V measurements.

FIG. 3a shows the SEM image of a $Ni_3S_2$@CNT in contact with four Au electrodes. Two samples (arbitrarily labeled A and B) were used to determine the contact resistance between the $Ni_3S_2$@CNT and the Au electrodes by measuring the resistance of the same segment 2-3 (as labeled in FIG. 3a) using both four-probe and two-probe measurements. It was found that the segment 2-3 of sample A measured a resistance of 5.499 kilo-ohms (kΩ) under the four-probe measurement and a resistance of 5.538 kΩ under the two-probe measurement, with both measurements showing a metallic behavior of $Ni_3S_2$@CNTs. Similarly, sample B had measured resistance values of 6.667 kΩ and 6.709 kΩ under the four-probe and two-probe measurements, respectively. Both these measurements revealed a very low contact resistance (about 40 Ohms) as compared to the intrinsic resistance of the segment of $Ni_3S_2$@CNT under investigation (5-7 kΩ). Thus, the two-probe measurements were performed to estimate the resistivity of $Ni_3S_2$@CNT using ten different samples given the simplicity and accuracy of the two-probe method in this case. The I-V characteristics of ten different $Ni_3S_2$@CNTs are shown in FIG. 3b while the I-V characteristics of samples A and B using four-probe and two-probe measurements are shown in FIGS. 3c and 3d, respectively. All these measurements show a perfect linear I-V relationship in individual $Ni_3S_2$@CNTs. The measured electrical parameters and resistivities of each $Ni_3S_2$@CNT are listed in FIG. 7. Interestingly, all $Ni_3S_2$@CNTs showed a purely metallic behavior with a mean resistivity of $6.1 \times 10^{-5}$ Ωm. This metallic property of $Ni_3S_2$@CNTs can be due to the presence of the metallic $Ni_3S_2$ at the core of the CNTs and the highly graphitized multi-walled CNT system with a big diameter as the current can flow simultaneously from both the $Ni_3S_2$ core and the CNT walls.

Figures 4A, 4B:
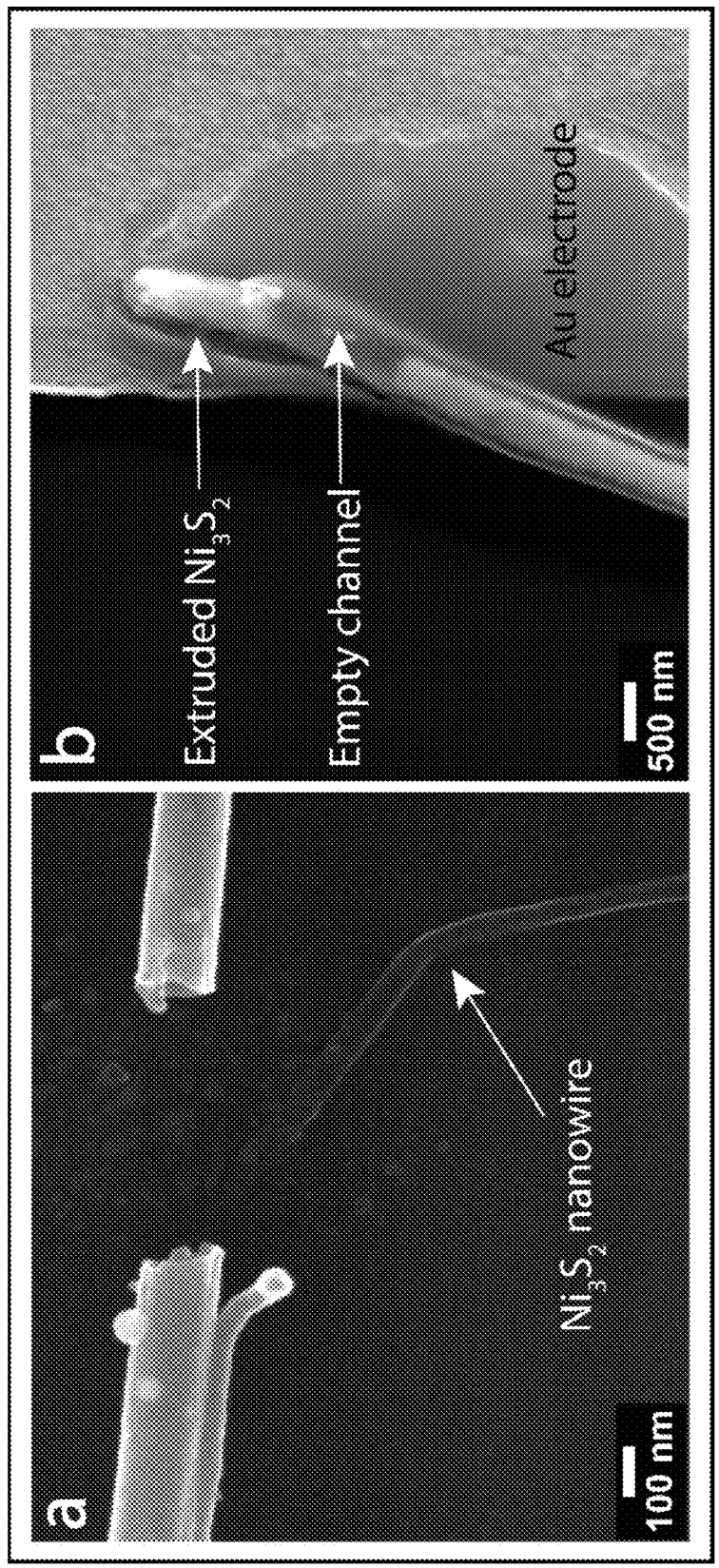
FIG. 4a is an SEM image showing electrical breakdown of a thin $Ni_3S_2$-filled CNT. The scale bar is 100 nm.
FIG. 4b is an SEM image showing electrical extrusion of $Ni_3S_2$ from the open end of an $Ni_3S_2$-filled CNT. The scale bar is 500 nanometers (nm).

FIG. 4 shows the size-dependent electrical breakdown of individual $Ni_3S_2$@CNTs at higher currents. It was observed that $Ni_3S_2$@CNTs with smaller diameters (less than 150 nm) can undergo an electrical breakdown when an excessive current passes through them. As an example, FIG. 4a shows a thin CNT with a diameter of about 150 nm that eventually broke down as the current exceeded 0.8 milliamp (mA). However, in the case of empty metallic multi-walled CNTs (MWCNTs), the electrical breakdown can occur at relatively smaller currents. The reason $Ni_3S_2$@CNTs can pass a very high current is that a high proportion of current can pass through $Ni_3S_2$ core, which has a low resistivity of $1.2 \times 10^{-6}$ Ωm, thereby inhibiting (or preventing) the rapid oxidation of CNT walls induced by the flow of current. If the diameter of the $Ni_3S_2$@CNT is smaller than 150 nm, there are relatively fewer CNT walls that will suffer defects and damages due to the current and can subsequently breakdown in fewer steps earlier than the melting of the $Ni_3S_2$ core that can be caused by Joule heating. After the breakdown of $Ni_3S_2$@CNT, the $Ni_3S_2$ nanowire is ejected out of the breakdown region, which can be seen in FIG. 4a. Thus, given their metallicity, thin $Ni_3S_2$@CNTs can be used as a nano circuit breaker to limit the flow of higher currents in electronic devices. On the other hand, if the diameter of $Ni_3S_2$@CNT is significantly higher, it doesn't breakdown even if a high amount of current (1 mA) passes through it. However, the $Ni_3S_2$ nanowire can melt and extrude out from the open end of the $Ni_3S_2$@CNT in the direction of the current flow. In this case, the melting temperature of $Ni_3S_2$ is reached before the breakdown of CNT. FIG. 4b illustrates an example of the electrical melting and extrusion of the $Ni_3S_2$ nanowire from a $Ni_3S_2$@CNT having a diameter of about 500 nm (and an open end), which was observed as the current exceeded 1 mA.

Example 2—Electrochemical Properties of $Ni_3S_2$@CNTs/CC

Figures 5A, 5B:
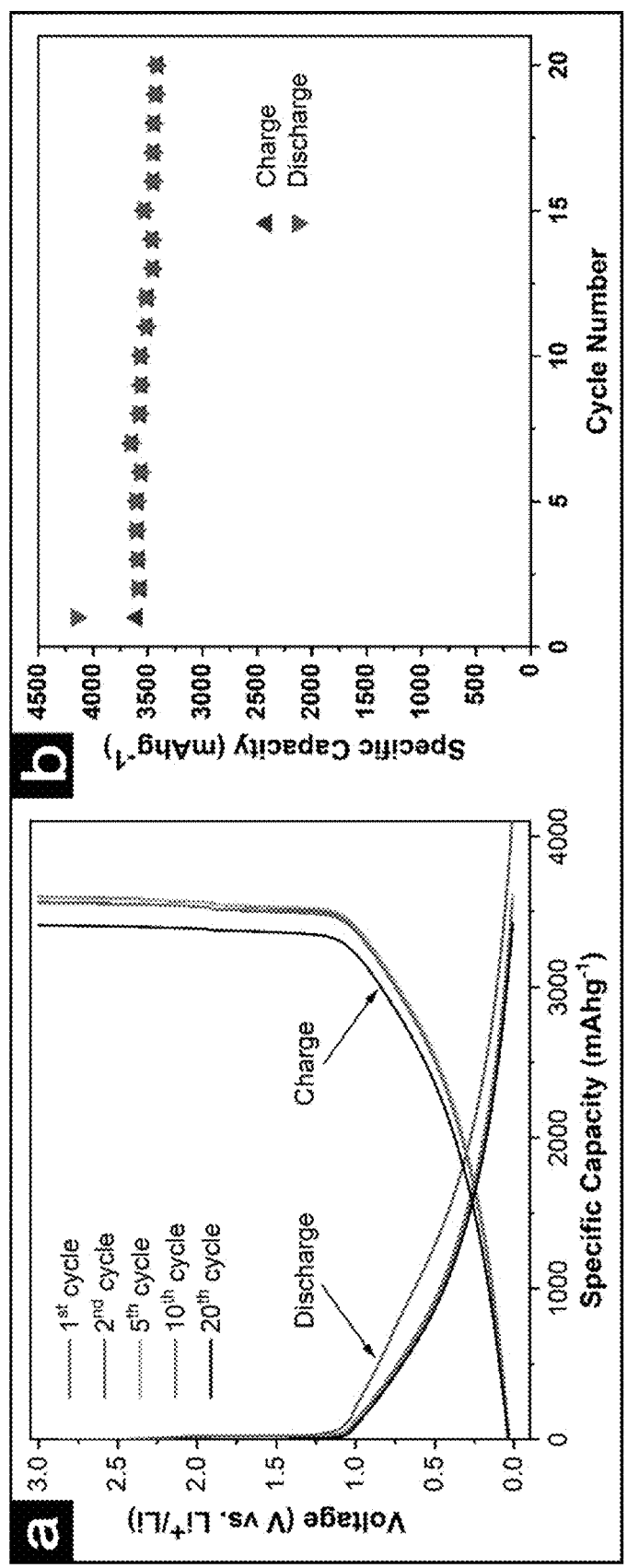
FIG. 5a is a plot of voltage (in V, versus lithium*/lithium ($Li^+$/Li)) versus specific capacity (in milliamp-hours per gram (mAh/g)), showing galvanostatic charge and discharge curves of an anode of $Ni_3S_2$-filled CNTs on CC at different cycles. The curve with highest value at 4150 mAh/g of the discharge grouping is for the first cycle; the other four curves, which are grouped closely together at 3410-3600 mAh/g in the discharge grouping, are for the second cycle, the fifth cycle, the tenth cycle, and the twentieth cycle, respectively. The closely grouped curves with the highest values at 3550-3600 mAh/g of the charge grouping are for the first cycle, the second cycle, the fifth cycle, and the tenth cycle; the other curve with highest value at 3420 mAh/g of the charge grouping is for the twentieth cycle
FIG. 5b shows a plot of specific capacity (in mAh/g) versus cycle number, showing cyclic stability of an anode of $Ni_3S_2$-filled CNTs on CC for the first 20 cycles at a current density of 100 milliamps per gram (mA/g). The upside-down-triangular data points are for discharge; and the right-side-up-triangular data points are for charge.

The electrochemical properties of the $Ni_3S_2$@CNTs/CC synthesized in Example 1 were evaluated as an anode material for LIBs using a coin cell assembly and constructing a nanobattery inside a transmission electron microscope (TEM). The initial lithiation results from the coin cell assembly are shown in FIGS. 5a and 5b. The half-cell including the $Ni_3S_2$@CNTs/CC anode delivered an initial discharge capacity of 4150 mAhg$^{-1}$ and a capacity of 3600 mAhg$^{-1}$ was retained during the first charge, which is about 86% of the initial discharge capacity as shown in FIG. 5a. In the subsequent cycles (2-10), the $Ni_3S_2$@CNTs/CC anode delivered a discharge capacity of 3600 mAhg$^{-1}$ and a charge capacity of 3550 mAhg$^{-1}$, showing very high reversibility of the lithiation and de-lithiation reactions. Even after 20 cycles, the Ni$_3$S$_2$@CNTs/CC anode exhibited a Coulombic efficiency of 99.7%, delivering the charge and discharge capacities of 3420 mAhg$^{-1}$ and 3410 mAg$^{-1}$, respectively, at a current density of 100 mAg$^{-1}$. This capacity is more than 9 times that of graphite (372 mAhg$^{-1}$) and 7 times greater than that of the theoretical capacity of bulk Ni$_3$S$_2$ (445 mAhg$^{-1}$). This tremendous lithium-ion storage capacity offered by the Ni$_3$S$_2$@CNTs/CC anode surpasses the capacities obtained experimentally for all metal oxides, phosphides, sulfides, nitrides, and alloys and reaches very close to the theoretical capacities of Li metal (3860 mAhg$^{-1}$) and Si (4200 mAhg$^{-1}$). Although pure Li metal and Si possess a high theoretical capacity, their real-life application is inhibited or prevented due to the uncontrollable dendritic Li growth and structure pulverization caused by a high-volume expansion, respectively. This necessitates the development of novel anode material such as Ni$_3$S$_2$@CNTs/CC, which can offer a high capacity along with high efficiency and stability. FIG. 5b shows the cyclic stability of Ni$_3$S$_2$@CNTs/CC electrode for 20 cycles observed at a current density of 100 mAg$^{-1}$. Interestingly, the charge-discharge stabilities after the first cycle can be clearly visualized by the perfect overlap between the right-side-up triangles (charge capacities) and the upside-down triangles (discharge capacities), forming a star shape in each cycle.

Figures 6A, 6B, 6C, 6D, 6E, 6F, 6G, 6H:
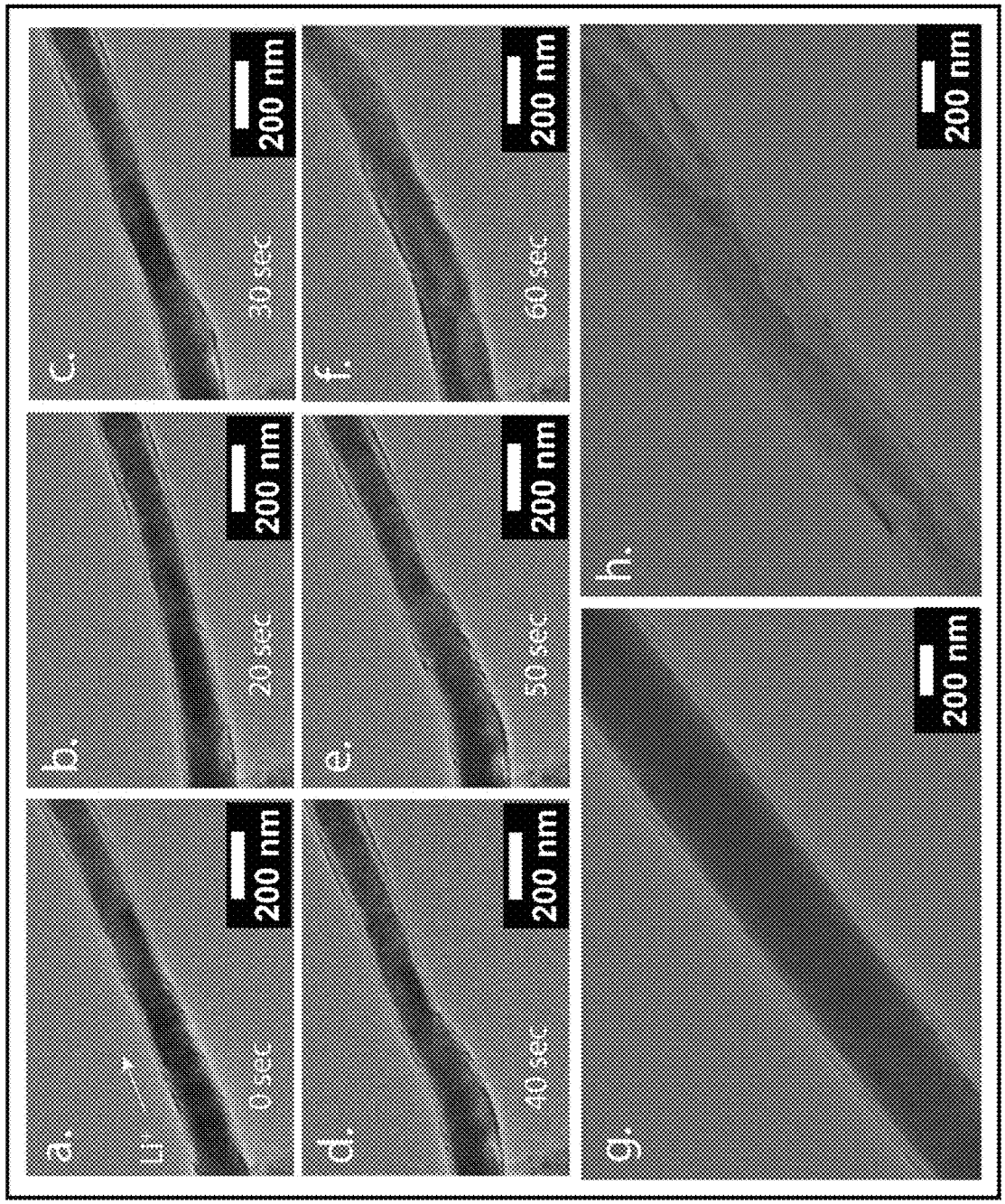
FIGS. 6a-6f show a series of transmission electron microscope (TEM) captured at 37.5 frames per second during dynamic in situ lithiation of a thin $Ni_3S_2$-filled CNT. The arrow in FIG. 6a shows the direction of propagation of lithium ions ($Li^+$).
FIG. 6g is a TEM image of a large-diameter $Ni_3S_2$-filled CNT before lithiation. The scale bar is 200 nm.
FIG. 6h is a TEM image of the large-diameter $Ni_3S_2$-filled CNT shown in FIG. 6g, after lithiation. The scale bar is 200 nm.

The electrochemical properties of individual Ni$_3$S$_2$@CNT were further investigated using dynamic in situ lithiation inside TEM and the dynamic lithiation behavior was observed in a Titan ETEM as shown in FIGS. 6a-6h. FIG. 6a shows the initial Ni$_3$S$_2$@CNT with a thin diameter of 160 nm before the lithiation reaction. As the bias was increased (−2 to −3V vs. Li), lithium ions can propagate in the direction shown by an arrow in FIG. 6a. As the lithium propagates through the nanowire, the CNT swells in the transverse direction as seen in FIGS. 6b-6f. For example, the diameter of Ni$_3$S$_2$@CNT increased to 175 nm after 40 seconds, as seen in FIG. 6d, revealing that the volume expansion of Ni$_3$S$_2$ during the lithiation can be easily accommodated by the radial expansion of highly graphitized, multi-walled CNT system. FIGS. 6g and 6h show the TEM images of another Ni$_3$S$_2$@CNT having a relatively larger diameter of 485 nm. In FIG. 6g, a single crystalline Ni$_3$S$_2$ nanowire located at the CNT core before the bias was applied can be observed. After lithiation, a significant change of the phase in the CNT core can be spotted along with a preserved integrity of the CNT walls, as seen in FIG. 6h. During the first lithiation reaction, Ni$_3$S$_2$ can react with Li$^+$ ions and reduce into Ni and Li$_2$S according to the reaction Ni$_3$S$_2$+4Li$^+$+4e$^-$→3Ni+2Li$_2$S. However, the exact phases of the lithiation reaction products could not be identified due to the limitation of the data. These in situ studies clearly demonstrate the propagation of Li+ ions across the Ni$_3$S$_2$ nanowire and the role of CNT walls in accommodating the volume expansion, which can cause the Ni$_3$S$_2$@CNTs/CC anodes to deliver an extremely high capacity along with a high stability.

In Examples 1 and 2, Ni$_3$S$_2$@CNTs were successfully synthesized on flexible CC substrates via a simple and reliable in situ method. Ni$_3$S$_2$@CNTs/CC material was characterized using techniques such as SEM and XRD to understand the morphology, microstructure, chemical composition, and functionalization. The intrinsic electrical properties of an individual Ni$_3$S$_2$@CNT were examined using both two-probe and four-point probe methods. The I-V measurements show the metallic properties of Ni$_3$S$_2$@CNTs along with an estimated resistivity of 6.1×10$^{-5}$ Ωm. It was also observed that this synthesis method can yield 100% metallic nanotubes eliminating the requirement of a technique to separate metallic nanotubes from a mixture of metallic and semiconducting nanotubes for various purposes. Ni$_3$S$_2$@CNTs with thin diameters (below 150 nm), being a purely metallic conductor, can be used as nano circuit breakers to limit the flow of higher electric currents in electronic devices. The electrochemical properties of Ni$_3$S$_2$@CNT/CC electrodes were examined as an anode material for LIBs, revealing tremendous charge-discharge capacities along with high stability. It was observed that a Ni$_3$S$_2$@CNT/CC anode can deliver a capacity of 3420 mAhg$^{-1}$ even after 20 cycles at a current density of 100 mAg$^{-1}$, which is significantly greater than the capacities obtained by related art nanomaterials and composites. The dynamic lithiation and structural changes of an individual Ni$_3$S$_2$@CNT were examined using in situ TEM lithiation, which demonstrated the key role of the multi-layered carbon shells towards the accommodation of the volume expansion and inhibition or prevention of the structural failure of the Ni$_3$S$_2$@CNT anode during the lithiation reaction. Given the high conductivity of Ni$_3$S$_2$@CNTs and the remarkable lithium-ion storage capacity obtained, Ni$_3$S$_2$@CNTs/CC can be used as advantageous anodes in LIBs (and/or SIBs).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A compound comprising:
   a carbon-based substrate;
   a carbon nanotube (CNT) disposed on the carbon-based substrate; and
   a nanowire of a metal sulfide filled in the CNT,
   the CNT filled with the nanowire being straight from a first end thereof to a second end thereof, and
   each of the first end and the second end of the CNT filled with the nanowire being closed with respective carbon shells.

2. The compound according to claim 1, the carbon-based substrate being carbon cloth, graphene, graphite, graphene oxide, carbon block, carbon fiber threads, carbon nanotube films, a carbon-coated substrate, a graphite-coated substrate, or a carbon nanotube film-coated substrate.

3. The compound according to claim 1, the metal sulfide being nickel sulfide, cobalt sulfide, or iron sulfide.

4. The compound according to claim 1, the metal sulfide being Ni$_3$S$_2$.

5. The compound according to claim 1, the CNT having a filling ratio of the metal sulfide of at least 0.80.

6. The compound according to claim 1, the CNT having a filling ratio of the metal sulfide of at least 0.90.

7. The compound according to claim 1, the CNT having a filling ratio of the metal sulfide of at least 0.95.

8. The compound according to claim 1, the CNT having a filling ratio of the metal sulfide of at least 0.99.

9. The compound according to claim 1, the CNT having a filling ratio of the metal sulfide of at least 0.999.

10. The compound according to claim 1, comprising a plurality of CNTs disposed on the carbon-based substrate, each CNT being filled with the nanowire,
   each CNT of the plurality of CNTs when filled with the nanowire being straight from a first end thereof to a second end thereof,
   each CNT of the plurality of CNTs when filled with the nanowire having the first end and the second end of the CNT being closed with respective carbon shell.

11. The compound according to claim 10, the plurality of CNTs having a filling rate of the metal sulfide of at least 0.80.

12. The compound according to claim 10, the plurality of CNTs having a filling rate of the metal sulfide of at least 0.90.

13. The compound according to claim 10, the plurality of CNTs having a filling rate of the metal sulfide of at least 0.95.

14. The compound according to claim 10, the plurality of CNTs having a filling rate of the metal sulfide of at least 0.99.

15. The compound according to claim 10, the plurality of CNTs having a filling rate of the metal sulfide of at least 0.999.

16. A battery, comprising:
   a cathode comprising lithium or sodium;
   an anode; and
   an electrolyte in contact with at least one of the cathode and the anode,
   the battery being a lithium-ion battery or a sodium-ion battery, and
   the anode comprising the compound according to claim 1.

17. A compound comprising:
   a carbon-based substrate;
   a plurality of carbon nanotubes (CNTs) disposed on the carbon-based substrate, each CNT of the plurality of CNTs comprising a nanowire of a metal sulfide filled therein,
   each CNT of the plurality of CNTs when filled with the nanowire being straight from a first end thereof to a second end thereof,
   each CNT of the plurality of CNTs when filled with the nanowire having the first end and the second end of the CNT being closed with respective carbon shells,
   the carbon-based substrate being carbon cloth, graphene, graphite, graphene oxide, carbon block, carbon fiber threads, carbon nanotube films, a carbon-coated substrate, a graphite-coated substrate, or a carbon nanotube film-coated substrate,
   the metal sulfide being $Ni_3S_2$,
   the plurality of CNTs having an average filling ratio of the metal sulfide of at least 0.80, and
   the plurality of CNTs having a filling rate of the metal sulfide of at least 0.80.

18. A battery, comprising:
   a cathode comprising lithium or sodium;
   an anode; and
   an electrolyte in contact with at least one of the cathode and the anode,
   the battery being a lithium-ion battery or a sodium-ion battery, and
   the anode comprising the compound according to claim 17.

* * * * *